Patented Aug. 12, 1952

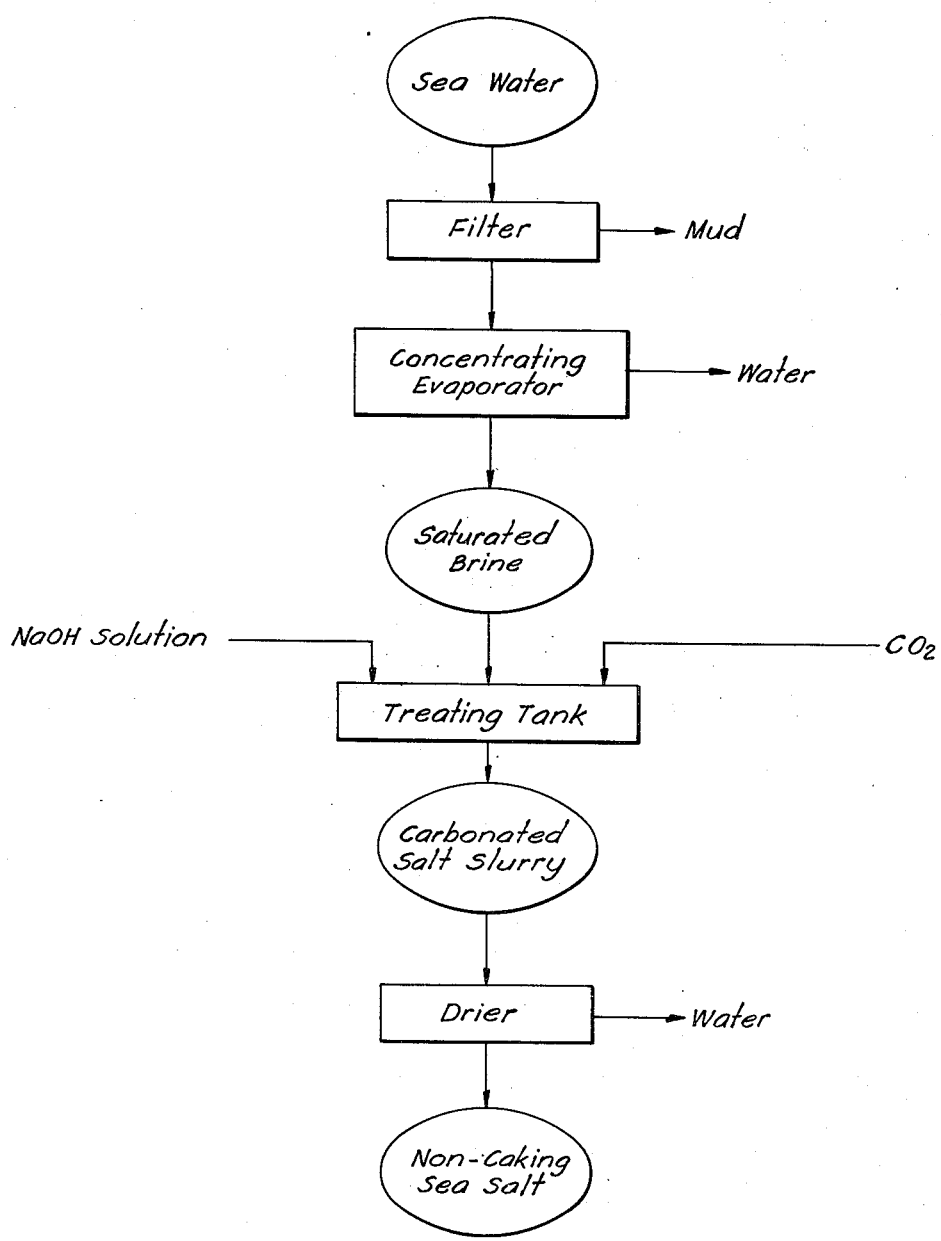

2,606,839

UNITED STATES PATENT OFFICE 2,606,839

NONCAKING SEA SALT AND METHOD OF PRODUCING THE SAME

Chives W. Evans, Freeport, Tex., assignor to The Dow Chemical Company, Midland, Mich., a corporation of Delaware Application March 21, 1951, Serial No. 216,814

9 Claims. (Cl. 99—143)

This invention relates to a process of making sea-salt in non-deliquescent, non-caking form. It also concerns the new product thus prepared.

Since earliest times, common salt has been made by evaporating seawater until a heavy precipitate is formed, leaving a bittern which is discarded while still liquid. The precipitate is nearly pure salt and contains little of the mineral values other than sodium chloride present in the original seawater.

On the other hand, if seawater is evaporated to dryness without separating the bittern, the product, known as "sea salt," contains virtually all the metallic and non-volatile elements in seawater. Improved retention of volatile elements, such as iodine, is said to be effected by maintaining the seawater neutral during evaporation (U. S. Patent 1,865,451). As a practical matter, however, sea-salt is seldom prepared because its extreme hygroscopicity makes it difficult to handle and store. Thus, when exposed to air under ordinary conditions, sea-salt rapidly crusts over, cakes, and finally deliquesces to a sticky brine.

None the less, because sea-salt contains traces of many nutritionally important mineral elements, it has often been recommended as a dietary supplement (cf. Chem. Eng. News. 28, 2410 (1950)). Recent experiments with cattle have seemingly confirmed the merit of feeding sea-salt in regions where the soil is poor ("The Land" 9, 247-9 (1950)). However, widespread use, or even testing, of sea-salt in nutrition has been badly hampered by the difficult handling problems it poses.

It is therefore the main object of the present invention to provide a modified salt made from seawater which retains all the nutritional values of sea-salt but which also does not cake or deliquesce, even at high atmospheric humidities. A related object is to provide a process for making the new product.

These objects are realized in the invention by first alkalizing and carbonating seawater to convert magnesium and calcium salts therein to normal or basic carbonates and then evaporating to dryness. The dried crystalline product, which retains virtually all the trace minerals in the seawater, is non-hygroscopic and will remain free-flowing, without crusting or caking, over long periods. It can be packaged, handled, and used as a table condiment and as a livestock feed supplement in the manner of common salt, but has all the nutritional advantage of sea-salt.

The source material for the new product may be seawater, debrominated seawater, or a concentrate obtained by partial evaporation of either. If raw seawater is used, it should be screened to exclude solid matter, and then preferably allowed to stand quiet, as in a clarifier, or passed through a sand filter, to remove mud and silt. Another convenient source is debrominated seawater, a byproduct of an industrial process for making bromine in which sea-water is acidified, oxidized with chlorine, and the bromine thus liberated removed by blowing with air (Ind. Eng. Chem. 26, 361 (1934)). Such debrominated seawater has the advantage of being thoroughly sterilized by its exposure to chlorine, but often contains a higher proportion of dissolved iron than ordinary seawater. To remove the iron, the acidified debrominated seawater is conveniently brought to neutrality (pH 7) with an alkali, such as sodium hydroxide, whereby ferric hydroxide forms as a precipitate, which is separated by settling or filtration. This settling step with ferric hydroxide is also very effective in removing residual quantities of mud in the seawater.

The seawater or neutralized debrominated seawater may, with advantage, be concentrated by evaporation of water before being alkalized and carbonated. Evaporation, either by contact with hot combustion gases, as in a spray evaporator, or by solar heating in ponds, is preferably carried out to the point where there results a nearly saturated solution of sodium chloride, corresponding to about 15 per cent sodium chloride by weight and to about 20 to 25 per cent total dissolved solids. This concentration step, while not essential to the invention, has the practical merit of reducing the bulk of the brine handled in the succeeding steps of the process and thus lowering equipment costs.

Following clarification and concentration, if any, the seawater or neutral debrominated seawater is then alkalized and carbonated to convert at least a major part of the dissolved magnesium and calcium salts to normal or basic carbonates. So far as known, there may be used any soluble alkali sufficiently strong to produce in the seawater or concentrate a pH value of at least 10 (the value at which magnesium hydroxide begins to precipitate), and better 10.5 to 11 or more. Likewise any soluble source of carbonate ions is operable. Thus, sodium carbonate alone, either in solid form or in solution, will fill both functions. However, by far the best results are achieved when the seawater or concentrate is first alkalized with aqueous sodium hydroxide solution to convert at least the major part of the magnesium and calcium salts to the corresponding hydroxides, and the resulting mixture then carbonated by injection of gaseous carbon dioxide. By operating in this manner, the magnesium and calcium salts are precipitated in a physical state especially advantageous to the properties of the final product.

The proportion of sodium hydroxide or other alkali used should be such as to be equivalent chemically to at least one-half the total magnesium and calcium salts present in the feed brine. Lesser proportions are insufficient to render the final solid product non-deliquescent. On the other hand, an excess of hydroxide relative to the magnesium and calcium salts is to be avoided because it may appear as free alkali in the product. In general, the proportion of alkali should be at least 60 per cent, and preferably 80 to 100 per cent, of that equivalent to the magnesium and calcium salts in the feed brine. The proportion of carbon dioxide should be approximately equivalent chemically to the added alkali, the equivalence being that required to produce a normal carbonate. (The term "carbonate" as used herein, in accordance with conventional terminology, excludes bicarbonate.) Over-carbonation, with resultant possible formation of soluble magnesium bicarbonate, is to be avoided. The carbonation step may be controlled by observing the pH value during introduction of carobn dioxide and stopping when the pH falls to a value of 8.0 to 8.5.

In practice, the sodium hydroxide may be from any convenient source, usually effluent catholyte from diaphragm-type caustic soda-chlorine electrolytic brine cells. The carbon dioxide need not be concentrated, water-washed combustion gases from power-plant boilers being entirely satisfactory. The mixing of these reagents with the seawater or seawater concentrate is usually carried out at atmospheric temperatures, either batchwise or continuously in conventional power-agitated treating tanks.

Following alkalization and carbonation, the entire treated brine is evaporated to dryness. Neither the precipitated carbonates of magnesium and calcium, nor any other solid phase present, is filtered out or otherwise removed; all are allowed to remain in the salt produced by the evaporation. This final removal of water may be carried out in any standard drier. Gas-fired open pans, shelf-driers, or better an externally gas-fired rotary kiln of corrosion-resistant metal, are satisfactory. The kiln has the advantage that it tumbles the product during drying, producing material of a desirably uniform and small crystal size. The heating is continued until a sensibly dry solid salt is produced. The dried salt may be heated at 200° to 400° C. with free access of air to burn off final traces of organic matter, if present. However, temperatures high enough to decompose the magnesium and calcium carbonates present should be avoided. For particular uses, the final dried salt may be ground, and sized by screening, or compressed into cakes.

The process of the invention, in a preferred form, is indicated schematically in the accompanying flowsheet.

The end product of the new process is non-deliquescent and non-caking, and may properly be described as a mineralized salt consisting substantially of sea-salt in which at least 50 per cent of the magnesium and calcium salts have been converted to carbonates. In the prefered case where nearly all the magnesium and calcium salts have been converted to carbonates, the product may be said to consist substantially of sodium chloride in admixture with carbonates of magnesium and calcium, the sodium, magnesium and calcium being present in substantially the same relative proportions as in seawater. The product, being made by total evaporation, also contains substantially all the other salts normally present in seawater in the relative proportions in which they occur in seawater. When debrominated seawater is the source brine the final salt contains less bromide, iodide, and perhaps less potassium than ordinary sea-salt, but is by no means devoid of these elements. The proportions of other elements are not significantly different.

Quantities of non-caking salt according to the invention, made both from seawater and from debrominated seawater, were fed experimentally, in place of salt, in both human and animal diets for periods of many months. There were no observable adverse effects and numerous reports of improvement in general health.

The following examples will further illustrate the invention.

*Example 1*

Raw seawater was clarified by passing through a sand filter and was then heated in an open vessel by submerged combustion natural gas burners to evaporate water. Heating was continued until the resulting concentrate contained about 25 per cent by weight of total dissolved solids. This concentrate, after cooling to atmospheric temperature, was run into an open tank provided with a power agitator. Aqueous sodium hydroxide solution containing 50 per cent of sodium hydroxide was then metered in gradually in a proportion equivalent to approximately 80 per cent of the magnesium and calcium salts present, the precise quantity required being determined by analysis. The pH value of the resulting solution, which contained precipitated magnesium hydroxide, was about 11.

Carbon dioxide was then injected into the hydroxide-containing concentrate in a proportion approximately equivalent chemically to the added sodium hydroxide, addition being stopped when a pH value of about 8.5 was reached. Carbonates of magnesium and calcium formed in the brine as precipitate. The entire carbonated mixture was then fed as a slurry to an externally-fired Monel-metal lined rotary kiln. The slurry was evaporated to dryness, leaving as a free-flowing mass of crystals at 300° to 400° C.

The final product was a non-caking non-deliquescent crystalline salt which remained free-flowing after some weeks of exposure in an open dish to air at a relative humidity at all times of 50 per cent or more. Chemical analysis of the salt showed the following elements or radicals in per cent by weight: Na, 31.2; Mg, 4.0; K, 1.06; Ca, 0.47; Cl, 50.6; $SO_4$, 5.2; $CO_2$, 2.3; and Br, 0.16. The following elements and radicals were also found by analysis, in parts per million: Fe, 12; Al, 6; Mn, less than 5; Cu, 11; Ni, 8; Sr, 110; $P_2O_5$, less than 5; F, 220; I, 0.6; and B, 94. Traces of many other elements were also apparent.

*Example 2*

Raw seawater was debrominated by acidifying with a mixture of hydrochloric and sulfuric acids to a pH value of about 3.5, after which chlorine was introduced until an electrochemical oxidation potential of 0.98 volt (antimony-calomel electrodes) was reached. Air was then blown through the chlorinated water to remove much of the bromine. The water was then returned to a pH value of about 7 by addition of 50 per cent sodium hydroxide solution. A precipitate of ferric hydroxide formed, and was removed by filtration. The resulting clarified debrominated seawater was then concentrated and treated with sodium hydroxide and carbon dioxide according to the procedure of Example 1 except that the hydroxide was added in a proportion equivalent to 100 per cent of the magnesium and calcium salts. After total evaporation, there was obtained a non-caking non-deliquescent salt. On analysis, it was found to contain, in per cent by weight: Na, 32.1; Mg, 3.3; Ca, 0.91; K, 1.04; Cl, 46.1; $SO_4$, 6.7; $CO_2$, 5.1, and in parts per million: Fe, 90; Al, 33; Mn, less than 5; Cu, 20; Ni, 13; Zn, less than 15; Sr, 520; $P_2O_5$, 8; Br, 230; F, 190; B, 1021, and I, 1.1. Traces of many other elements were also present. This product contained 84.7 per cent by weight of water-soluble material, which was almost entirely sodium chloride with a little sodium sulfate, and 15.3 per cent of water-insoluble material. The latter, on X-ray diffraction analysis, were found to consist mainly of 40 to 50 per cent hydromagnesite ($4MgCO_3 \cdot Mg(OH)_2 \cdot 4H_2O$), 30 to 40 per cent northupite ($Na_3MgCl(CO_3)_2$), 10 to 20 per cent calcite ($CaCO_3$), and 5 to 10 per cent magnesite ($MgCO_3$).

The product, white in color, was tested as a table condiment and found as acceptable as ordinary salt. In salt-shakers, it remained free-flowing in damp weather for weeks after ordinary table salt had crusted badly.

What is claimed is:

1. A process of producing a substantially non-deliquescent non-caking mineralized salt from seawater, debrominated seawater, and concentrates thereof which comprises alkalizing and carbonating the water in a proportion equivalent chemically to at least one-half the total magnesium and calcium salts in the water, and evaporating the treated water to dryness.

2. A process of producing a substantially non-deliquescent non-caking mineralized salt from seawater, debrominated seawater, and concentrates thereof which comprises mixing alkali with the water in a proportion sufficient to produce therein a pH value of at least 10 and to convert at least 60 per cent of the total magnesium and calcium salts in the water to the corresponding hydroxides, introducing carbon dioxide into the alkaline water to an extent approximately sufficient to convert the magnesium and calcium hydroxides to carbonates but insufficient to lower the pH value below 8, and evaporating the entire carbonated product to dryness.

3. A process of producing a substantially non-deliquescent non-caking mineralized salt from seawater, debrominated seawater, and concentrates thereof which comprises adding sodium hydroxide to the water in a proportion substantially equivalent chemically to the magnesium and calcium salts in the water to convert them to the corresponding hydroxides, introducing gaseous carbon dioxide into the thus-treated water in a proportion approximately equal to that required to convert the magnesium and calcium hydroxides to carbonates, and evaporating the entire carbonated product to dryness.

4. A process according to claim 3 wherein the water is seawater debrominated by acidification, oxidation with chlorine, and removal of the bromine thus liberated by blowing with air.

5. A process of producing a substantially non-deliquescent non-caking mineralized table salt from acidified debrominated seawater which comprises approximately neutralizing the water with alkali, whereby a ferric hydroxide-containing precipitate is formed, separating the precipitate, and thereafter subjecting the precipitate-free water to the process of claim 3.

6. A process of producing a substantially non-deliquescent non-caking mineralized table salt from seawater and debrominated seawater which comprises treating the water as needed to produce a neutral pH therein, clarifying the neutral water to remove solids, concentrating the clarified water by vaporizing water therefrom until a total solids content of 20 to 25 per cent by weight is reached, adding sodium hydroxide to the concentrate in a proportion sufficient to produce therein a pH value of at least 10 and to convert at least 60 per cent of the total magnesium and calcium salts in the concentrate to the corresponding hydroxides, injecting carbon dioxide into the hydroxide-containing concentrate in a proportion approximately equal to that required to convert the magnesium and calcium hydroxides to normal carbonates, and heating the carbonated concentrate to vaporize water therefrom without removal of any solid phase until a sensibly dry product is obtained.

7. A non-deliquescent non-caking mineralized salt consisting substantially of sea salt in which at least 50 per cent of the magnesium and calcium salts have been converted to carbonates.

8. A non-deliquescent non-caking mineralized table salt consisting substantially of sea salt in which substantially all the magnesium and calcium salts have been converted to carbonates.

9. A non-deliquescent non-caking table condiment derived from seawater and consisting predominantly of sodium chloride in admixture with carbonates of magnesium and calcium, sodium, magnesium and calcium being present in substantially the same relative proportions as in seawater, and also containing substantially all the other salts normally present in seawater in the relative proportions in which they occur in seawater.

CHIVES W. EVANS.

REFERENCES CITED

The following references are of record in the file of this patent:

UNITED STATES PATENTS

| Number | Name | Date |
|---|---|---|
| 902,403 | Holloway | Oct. 27, 1908 |

FOREIGN PATENTS

| Number | Country | Date |
|---|---|---|
| 268,181 | Great Britain | Mar. 31, 1927 |